United States Patent
Muthiah et al.

(10) Patent No.: US 11,030,106 B2
(45) Date of Patent: Jun. 8, 2021

(54) STORAGE SYSTEM AND METHOD FOR ENABLING HOST-DRIVEN REGIONAL PERFORMANCE IN MEMORY

(71) Applicant: Western Digital Technologies, Inc., San Jose, CA (US)

(72) Inventors: Ramanathan Muthiah, Bangalore (IN); Ramkumar Ramamurthy, Bangalore (IN); Judah Gamliel Hahn, Ofra (IL)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 16/444,418

(22) Filed: Jun. 18, 2019

(65) Prior Publication Data

US 2020/0401525 A1  Dec. 24, 2020

(51) Int. Cl.
*G06F 12/08* (2016.01)
*G06F 12/0875* (2016.01)
*G06F 12/121* (2016.01)
*G06F 12/10* (2016.01)

(52) U.S. Cl.
CPC .......... *G06F 12/0875* (2013.01); *G06F 12/10* (2013.01); *G06F 12/121* (2013.01); *G06F 2212/1021* (2013.01); *G06F 2212/1044* (2013.01); *G06F 2212/657* (2013.01)

(58) Field of Classification Search
CPC . G06F 12/0875; G06F 12/0888; G06F 12/121
USPC ........................................................ 711/133
See application file for complete search history.

(56) References Cited

U.S. PATENT DOCUMENTS

| | | | |
|---|---|---|---|
| 8,117,374 B2 | 2/2012 | Kim et al. | |
| 9,471,254 B2 | 10/2016 | Shaharabany et al. | |
| 9,990,158 B2 | 6/2018 | Shaharabany et al. | |
| 2003/0093621 A1* | 5/2003 | DeSota | G06F 12/0848 711/118 |
| 2006/0117143 A1* | 6/2006 | Emerson | G06F 12/0888 711/128 |
| 2009/0276575 A1* | 11/2009 | Takai | G06F 8/4442 711/118 |
| 2011/0072213 A1* | 3/2011 | Nickolls | G06F 12/121 711/122 |
| 2011/0208943 A1 | 8/2011 | Schott | |
| 2011/0307664 A1* | 12/2011 | Paver | G06F 12/121 711/128 |
| 2014/0082288 A1 | 3/2014 | Beard et al. | |

(Continued)

OTHER PUBLICATIONS

International Search Report and Written Opinion for Application No. PCT/US2019/067390, dated Apr. 16, 2020, 12 pages.

*Primary Examiner* — Than Nguyen
(74) *Attorney, Agent, or Firm* — Brinks Gilson & Lione

(57) ABSTRACT

A storage system and method for enabling host-driven regional performance in memory are provided. In one embodiment, a method is provided comprising receiving a directive from a host device as to a preferred logical region of a non-volatile memory in a storage system; and based on the directive, modifying a caching policy specifying which pages of a logical-to-physical address map stored in the non-volatile memory are to be cached in a volatile memory of the storage system. Other embodiments are provided, such as modifying a garbage collection policy of the storage system based on information from the host device regarding a preferred logical region of the memory.

20 Claims, 5 Drawing Sheets

(56) References Cited

U.S. PATENT DOCUMENTS

| | | |
|---|---|---|
| 2014/0215129 A1 | 7/2014 | Kuzmin et al. |
| 2015/0149732 A1* | 5/2015 | Kiperberg ............ G06F 12/0888 711/139 |
| 2015/0220280 A1 | 8/2015 | Ishizaki |
| 2016/0274797 A1 | 9/2016 | Hahn |
| 2016/0378690 A1* | 12/2016 | Kiperberg ............ G06F 12/0802 713/193 |
| 2017/0068451 A1 | 3/2017 | Kenan et al. |
| 2018/0039412 A1* | 2/2018 | Singh .................... G06F 3/0664 |
| 2019/0050331 A1* | 2/2019 | Aneja ................... G06F 9/4401 |

* cited by examiner

STORAGE SYSTEM AND METHOD FOR ENABLING HOST-DRIVEN REGIONAL PERFORMANCE IN MEMORY

BACKGROUND

Some storage systems have specifications that detail features and requirements of the use of the storage system. One such specification is the Non-Volatile Memory Express (NVMe) specification. The NVMe specification contains a provision that allows a host device to inform the storage system of its preferred logical region(s) in terms of performance and endurance. A storage system can map high performance regions to single level cells (SLC) in memory to provide better performance.

DETAILED DESCRIPTION

Overview

Figure 1A:
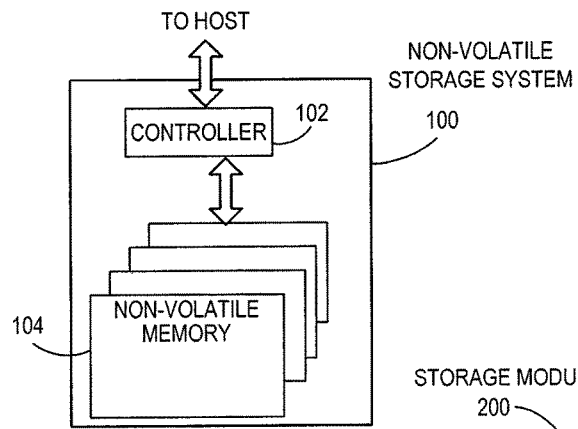
FIG. 1A is a block diagram of a non-volatile storage system of an embodiment.

By way of introduction, the below embodiments relate to a storage system and method for enabling host-driven regional performance in memory. In one embodiment, a method is provided for enabling host-driven regional performance in memory. The method is performed in a storage system comprising a non-volatile memory and a volatile memory. The method comprises receiving a directive from a host device as to a preferred logical region of the non-volatile memory; and based on the directive, modifying a caching policy specifying which pages of a logical-to-physical address map stored in the non-volatile memory are to be cached in the volatile memory.

In some embodiments, modifying the caching policy comprises caching only those pages of the logical-to-physical address map that cover the preferred logical region directed by the host device.

In some embodiments, modifying the caching policy comprises caching more pages of the logical-to-physical address map that cover the preferred logical region directed by the host device than pages of the logical-to-physical address map that cover other logical regions.

In some embodiments, modifying the caching policy comprises giving a preference to avoid evicting pages of the logical-to-physical address map that cover the preferred logical region during a swap in/out process.

In some embodiments, the method further comprises mapping the preferred logical region to one or more single level cell (SLC) blocks in the memory.

In another embodiment, a storage system is provided comprising a memory; and a controller configured to be in communication with the memory. The controller is further configured to: receive information from a host device regarding a preferred logical region of the memory; and based on the information from the host device, modifying a garbage collection policy of the storage system.

In some embodiments, the controller is configured to modify the garbage collection policy of the storage system by modifying a host-write-to-garbage-collection ratio while processing commands in the preferred logical region of the memory to reduce or avoid garbage collection.

In some embodiments, an absolute amount of garbage collection to be performed is based on a garbage collection state and/or a garbage collection backlog in the storage system.

In some embodiments, the controller is configured to modify the garbage collection policy of the storage system by choosing source blocks for garbage collection that contain less than a threshold amount of data falling under the preferred logical region.

In some embodiments, source blocks are chosen using a physical-to-logical address map.

In some embodiments, the memory comprises a three-dimensional memory.

In some embodiments, the storage system is configured to be integrated in the host device.

In some embodiments, the storage system is configured to be removably connected with the host device.

In another embodiment, a storage system is provided comprising: a non-volatile memory; a volatile memory; means for receiving a directive from a host device as to a preferred logical region of the non-volatile memory; and one or both of: means for, based on the directive, modifying a caching policy specifying which pages of a logical-to-physical address map stored in the non-volatile memory are to be cached in the volatile memory; and means for, based on the directive, modifying a garbage collection policy of the storage system.

In some embodiments, modifying the caching policy comprises caching only those pages of the logical-to-physical address map that cover the preferred logical region directed by the host device.

In some embodiments, modifying the caching policy comprises caching more pages of the logical-to-physical address map that cover the preferred logical region directed by the host device than pages of the logical-to-physical address map that cover other logical regions.

In some embodiments, modifying the caching policy comprises giving a preference to avoid evicting pages of the logical-to-physical address map that cover the preferred logical region during a swap in/out process.

In some embodiments, modifying the garbage collection policy of the storage system comprises modifying a host-write-to-garbage-collection ratio while processing commands in the preferred logical region of the memory to reduce or avoid garbage collection.

In some embodiments, modifying the garbage collection policy of the storage system comprises choosing source blocks for garbage collection that contain less than a threshold amount of data falling under the preferred logical region.

In some embodiments, source blocks are chosen using a physical-to-logical address map.

Other embodiments are possible, and each of the embodiments can be used alone or together in combination. Accordingly, various embodiments will now be described with reference to the attached drawings.

Embodiments

Figure 1B:
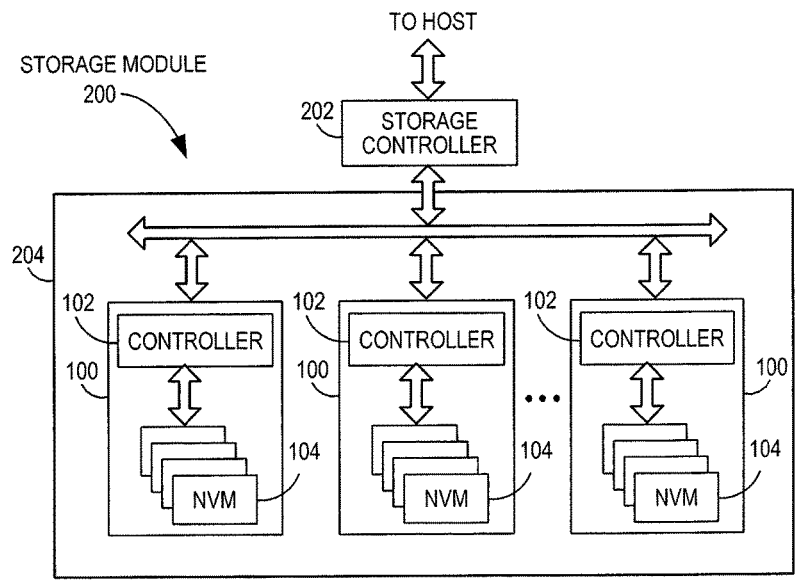
FIG. 1B is a block diagram illustrating a storage module of an embodiment.
Figure 1C:
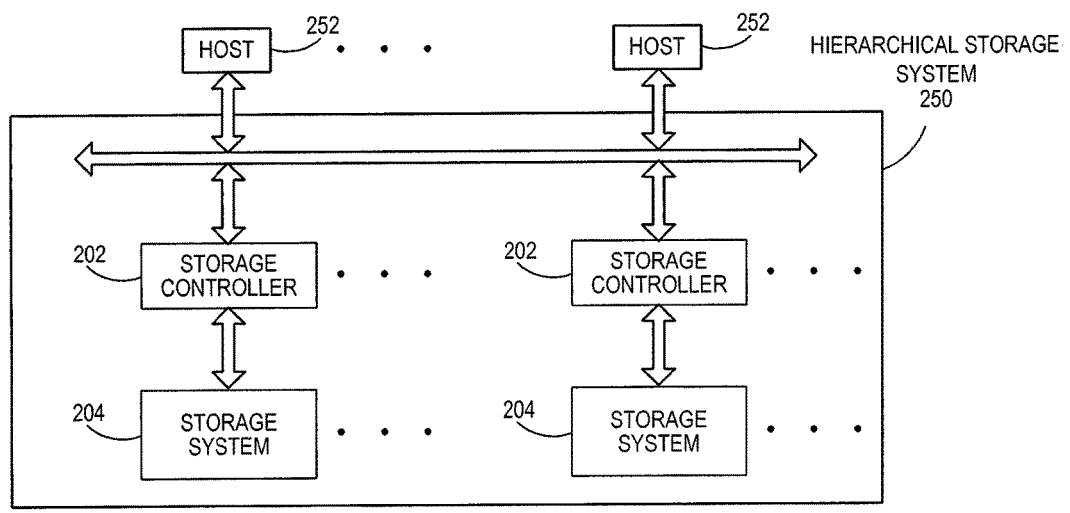
FIG. 1C is a block diagram illustrating a hierarchical storage system of an embodiment.

Storage systems suitable for use in implementing aspects of these embodiments are shown in FIGS. 1A-1C. FIG. 1A is a block diagram illustrating a non-volatile storage system 100 according to an embodiment of the subject matter described herein. Referring to FIG. 1A, non-volatile storage system 100 includes a controller 102 and non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. Controller 102 interfaces with a host system and transmits command sequences for read, program, and erase operations to non-volatile memory die 104.

The controller 102 (which may be a non-volatile memory controller (e.g., a flash, resistive random-access memory (ReRAM), phase-change memory (PCM), or magnetoresistive random-access memory (MRAM) controller)) can take the form of processing circuitry, a microprocessor or processor, and a computer-readable medium that stores computer-readable program code (e.g., firmware) executable by the (micro)processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a non-volatile memory controller is a device that manages data stored on non-volatile memory and communicates with a host, such as a computer or electronic device. A non-volatile memory controller can have various functionality in addition to the specific functionality described herein. For example, the non-volatile memory controller can format the non-volatile memory to ensure the memory is operating properly, map out bad non-volatile memory cells, and allocate spare cells to be substituted for future failed cells. Some part of the spare cells can be used to hold firmware to operate the non-volatile memory controller and implement other features. In operation, when a host needs to read data from or write data to the non-volatile memory, it can communicate with the non-volatile memory controller. If the host provides a logical address to which data is to be read/written, the non-volatile memory controller can convert the logical address received from the host to a physical address in the non-volatile memory. (Alternatively, the host can provide the physical address.) The non-volatile memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including resistive random-access memory (ReRAM), magnetoresistive random-access memory (MRAM), phase-change memory (PCM), NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC), triple-level cells (TLC), or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, storage system 100 may be a card based system, such as a secure digital (SD) or a micro secure digital (micro-SD) card. In an alternate embodiment, storage system 100 may be part of an embedded storage system.

Although, in the example illustrated in FIG. 1A, non-volatile storage system 100 (sometimes referred to herein as a storage module) includes a single channel between controller 102 and non-volatile memory die 104, the subject matter described herein is not limited to having a single memory channel. For example, in some storage system architectures (such as the ones shown in FIGS. 1B and 1C), 2, 4, 8 or more memory channels may exist between the controller and the memory device, depending on controller capabilities. In any of the embodiments described herein, more than a single channel may exist between the controller and the memory die, even if a single channel is shown in the drawings.

FIG. 1B illustrates a storage module 200 that includes plural non-volatile storage systems 100. As such, storage module 200 may include a storage controller 202 that interfaces with a host and with storage system 204, which includes a plurality of non-volatile storage systems 100. The interface between storage controller 202 and non-volatile storage systems 100 may be a bus interface, such as a serial advanced technology attachment (SATA), peripheral component interconnect express (PCIe) interface, or double-data-rate (DDR) interface. Storage module 200, in one embodiment, may be a solid state drive (SSD), or non-volatile dual in-line memory module (NVDIMM), such as found in server PC or portable computing devices, such as laptop computers, and tablet computers.

FIG. 1C is a block diagram illustrating a hierarchical storage system. A hierarchical storage system 250 includes a plurality of storage controllers 202, each of which controls a respective storage system 204. Host systems 252 may access memories within the storage system via a bus interface. In one embodiment, the bus interface may be a Non-Volatile Memory Express (NVMe) or fiber channel over Ethernet (FCoE) interface. In one embodiment, the system illustrated in FIG. 1C may be a rack mountable mass storage system that is accessible by multiple host computers, such as would be found in a data center or other location where mass storage is needed.

Figure 2A:
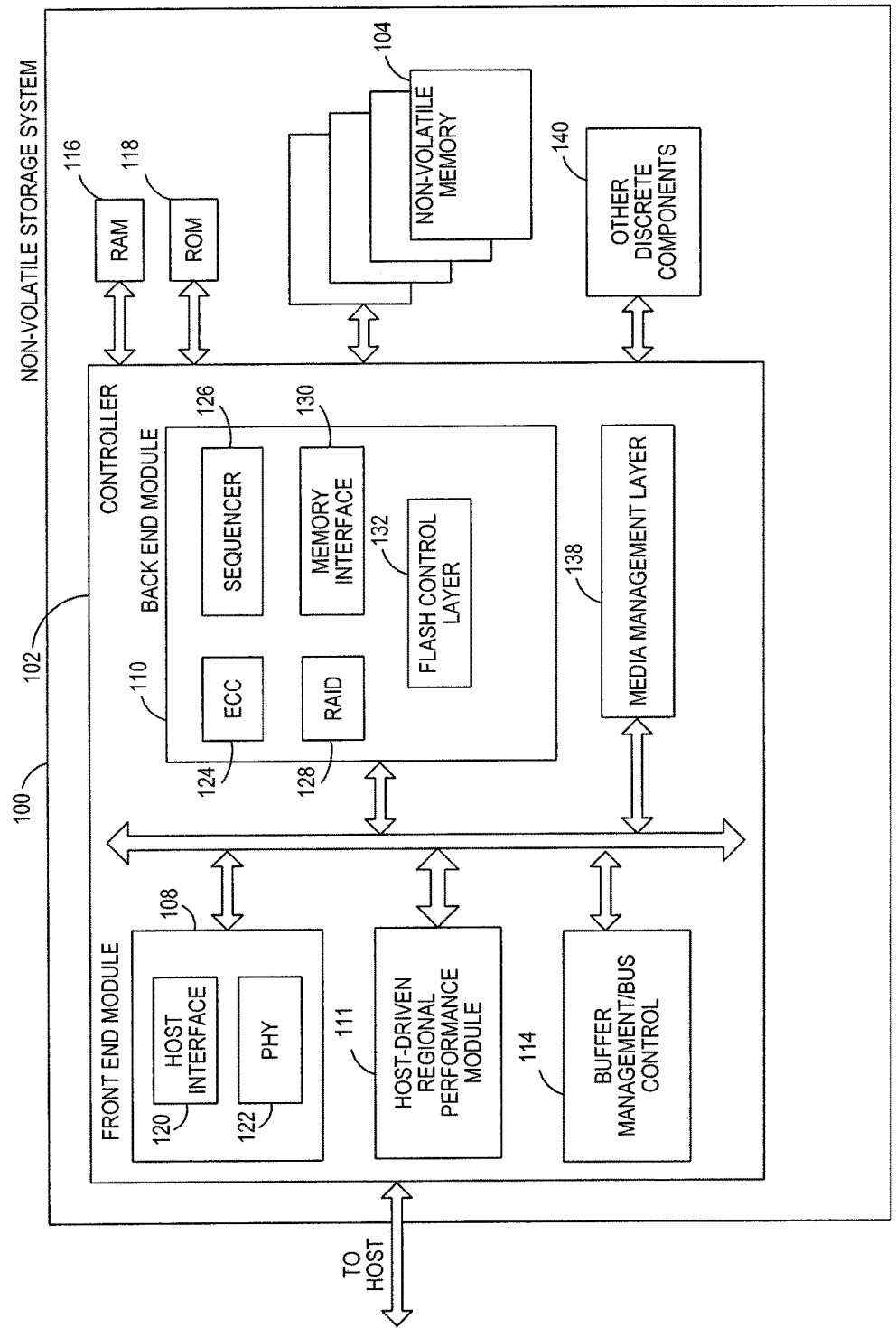
FIG. 2A is a block diagram illustrating components of the controller of the non-volatile storage system illustrated in FIG. 1A according to an embodiment.

FIG. 2A is a block diagram illustrating components of controller 102 in more detail. Controller 102 includes a front end module 108 that interfaces with a host, a back end module 110 that interfaces with the one or more non-volatile memory die 104, and various other modules that perform functions which will now be described in detail. A module may take the form of a packaged functional hardware unit designed for use with other components, a portion of a program code (e.g., software or firmware) executable by a (micro)processor or processing circuitry that usually performs a particular function of related functions, or a self-contained hardware or software component that interfaces with a larger system, for example. Modules of the controller 102 may include a host-driven regional performance module 111, which is discussed in more detail below, and can be implemented in hardware or software/firmware. The host-driven regional performance module 111 can be configured to perform the algorithms and methods discussed below and shown in the attached drawings.

Referring again to modules of the controller 102, a buffer manager/bus controller 114 manages buffers in random access memory (RAM) 116 and controls the internal bus arbitration of controller 102. A read only memory (ROM) 118 stores system boot code. Although illustrated in FIG. 2A as located separately from the controller 102, in other embodiments one or both of the RAM 116 and ROM 118 may be located within the controller. In yet other embodiments, portions of RAM and ROM may be located both within the controller 102 and outside the controller.

Front end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, serially attached small computer system interface (SAS), Fibre Channel, universal serial bus (USB), PCIe, and NVMe. The host interface 120 typically facilitates transfer for data, control signals, and timing signals.

Back end module 110 includes an error correction code (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. A flash control layer 132 controls the overall operation of back end module 110.

The storage system 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller 114 are optional components that are not necessary in the controller 102.

Figure 2B:
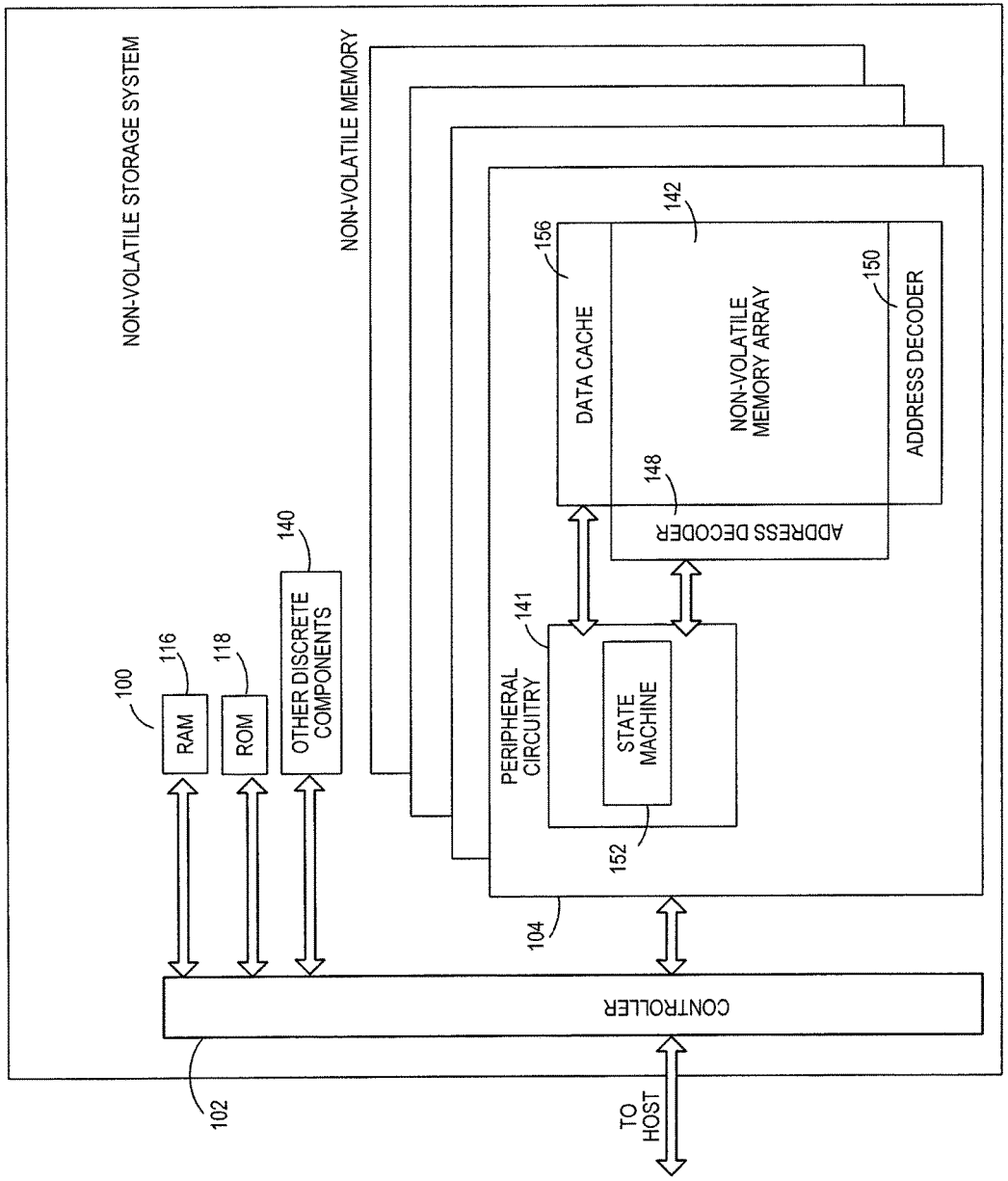
FIG. 2B is a block diagram illustrating components of the non-volatile memory storage system illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including ReRAM, MRAM, PCM, NAND flash memory cells and/or NOR flash memory cells in a two dimensional and/or three dimensional configuration. Non-volatile memory die 104 further includes a data cache 156 that caches data. Peripheral circuitry 141 includes a state machine 152 that provides status information to the controller 102.

Returning again to FIG. 2A, the flash control layer 132 (which will be referred to herein as the flash translation layer (FTL) or, more generally, the "media management layer," as the memory may not be flash) handles flash errors and interfaces with the host. In particular, the FTL, which may be an algorithm in firmware, is responsible for the internals of memory management and translates writes from the host into writes to the memory 104. The FTL may be needed because the memory 104 may have limited endurance, may only be written in multiples of pages, and/or may not be written unless it is erased as a block. The FTL understands these potential limitations of the memory 104, which may not be visible to the host. Accordingly, the FTL attempts to translate the writes from host into writes into the memory 104.

The FTL may include a logical-to-physical address (L2P) map and allotted cache memory. In this way, the FTL translates logical block addresses ("LBAs") from the host to physical addresses in the memory 104. The FTL can include other features, such as, but not limited to, power-off recovery (so that the data structures of the FTL can be recovered in the event of a sudden power loss) and wear leveling (so that the wear across memory blocks is even to prevent certain blocks from excessive wear, which would result in a greater chance of failure).

As mentioned above, some storage systems have specifications that detail features and requirements of the use of the storage system. One such specification is the Non-Volatile Memory Express (NVMe) specification. The NVMe specification contains a provision that allows a host device to inform the storage system of its preferred logical region(s) in terms of performance and endurance. A storage system can map high performance regions to single level cells (SLC) in memory to provide better performance. However, such mapping may not be optimal if it does not accommodate control data behavior and garbage collection state, which also utilizes a major portion of the storage system controller's bandwidth.

The following embodiments address this situation by having the storage system manage its flash translation layer (FTL) caching policy (e.g., to specify which pages of a logical-to-physical address map stored in the storage system's non-volatile memory 104 are to be cached in its volatile memory 116) and/or manage its garbage collection policy after receiving a host directive on logical-region-based performance. This provides the advantage of enabling the storage system 100 to have finer control of control page caching and to optimize storage system resources for better performance in the host-directed logical regions. The following paragraphs provide example implementations of these embodiments.

There are many ways that the storage system 100 can modify its FTL caching policy based on a directive from the host device regarding its preferred logical region. In one implementation, FTL pages can be physically split, and the storage system 100 can cache (in volatile memory 116) only those sub-pages of the logical-to-physical address map that cover the preferred logical region directed by the host device. This can result in optimal use of the limited cache 116. For example, if an FTL page is 32 kilobytes (KB) and only a portion of it (e.g., 16 KB covering a 16 megabyte (MB) preferred region) is required, then only that portion can be proactively cached in volatile memory 116. This way, a smaller portion of volatile memory 116 would be sufficient and would assist the storage system 100 to lock those pages until the next host directive.

Figure 3:
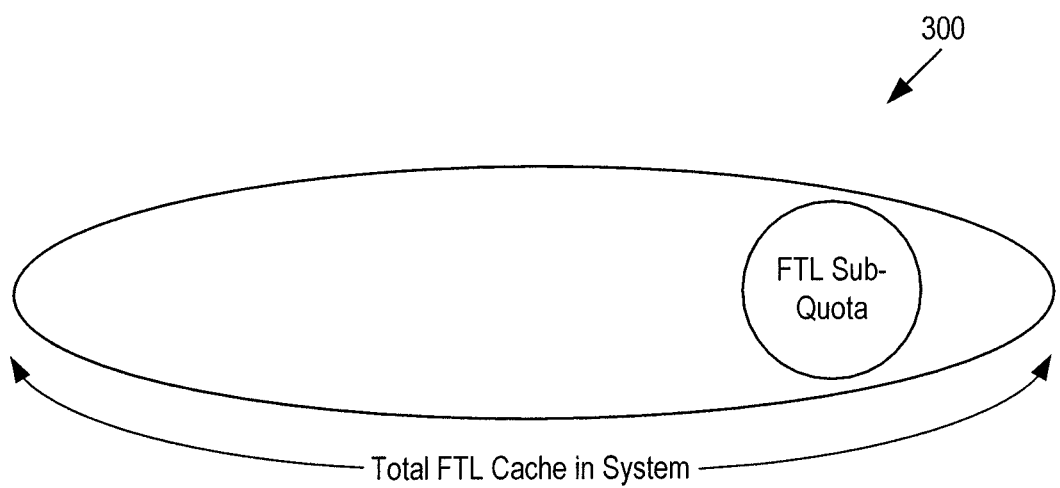
FIG. 3 is diagram showing a flash translation layer (FTL) sub-quota of an embodiment.

In another implementation, the storage system 100 can modify its caching policy by caching more pages of the logical-to-physical address map that cover the preferred logical region directed by the host device than pages of the logical-to-physical address map that cover other logical regions. As shown in the diagram 300 in FIG. 3, a separate sub quota for the FTL cache under the host-directed region can be maintained and dynamically increased on an as-needed basis at the cost of other regions. In a modified version, preference during swap in and out can be given to those FTL pages/sub-pages covering the logical-to-physical address map of the host-defined regions. An enhanced quota and/or a separate quota of a control page caching FTL and other related pages for a host-preferred region can enable better performance for the region. For example, a flash management system can have a better sub-quota for FTL page caching, as well as lock them for an amount of time until the directive changes. Dynamically modifying the FTL cache quota based on the host-defined region is possible as well. Further, the storage system 100 can also tweak its swap-in and out logic to give preference to safeguard (and not evict) FTL pages covering host-preferred logical regions (i.e., so that the sub-quota is not released during swap-in and out of FTL pages). Also, the sub-quota can be used to cache sub-pages conceived as a result of covering a host-preferred region smaller than the region covered by full FTL page architectures.

As mentioned above, instead of or in addition to modifying its FTL caching policy, the storage system 100 can modify its garbage collection policy based on the host's preferred logical region of memory. There are many ways that the storage system 100 can modify its garbage collection policy. For example, the storage system 100 can modify a host-write-to-garbage-collection ratio while processing commands in the preferred logical region of the memory 104 to reduce or avoid garbage collection. The absolute amount of garbage collection to be performed can be based on a garbage collection state and/or a garbage collection backlog in the storage system 100.

In this example, the storage system 100 can tweak the host-write-to-garbage-collection ratio such that any read or write ranges falling under the host-preferred logical regions can be performed with low latency. In other words, the storage system 100 can perform less or no garbage collection when performing commands in the preferred regions, which itself can be based on the state of the storage system 100. For example, if the storage system 100 has sufficient margin to postpone garbage collection, the storage system 100 may not perform garbage collection at all for commands in the host-preferred logical regions. On the other hand, if the storage system 100 has fewer free blocks than a threshold and needs urgent data movement, the storage system 100 may perform at least the critically-required garbage collection even when performing commands in the host-preferred regions. This enables the storage system 100 to take a middle ground between the host directive and the internal garbage collection backlog state. Further, the storage system 100 can be configured to ensure that it does not continue with minimum/no garbage collection for more than a certain amount of time to avoid critical free block situations.

As another example of how a storage system 100 can modify its garbage collection policy, the storage system 100 can choose source blocks for garbage collection that contain less than a threshold amount of data (which can include no data) falling under the preferred logical region. The source blocks can be chosen using a physical-to-logical address map (e.g., reverse FTL pages can indicate various logical data present in a given physical block). In this example, upon receiving a host directive for a logical region, if the storage system 100 decides to perform garbage collection, any form of data movement for the logical region during garbage collection can be postponed. The host preferred the region for a reason, and given that the region is likely going to have a lot of activity, there is an increased chance of invalidation of existing data in the preferred region during this period. If a source block being picked for garbage collection has almost all the logical block address (LBA) regions falling under the host-defined logical region and if the host performs a good amount of writes such that most of the data in the garbage collection source block is invalidated, then the worst case would be that the data is successfully relocated to a garbage collection destination and subsequently the host rewrites that data, making the garbage collection effort go in vain. Instead, picking another source block would help the storage system 100.

Figure 4:
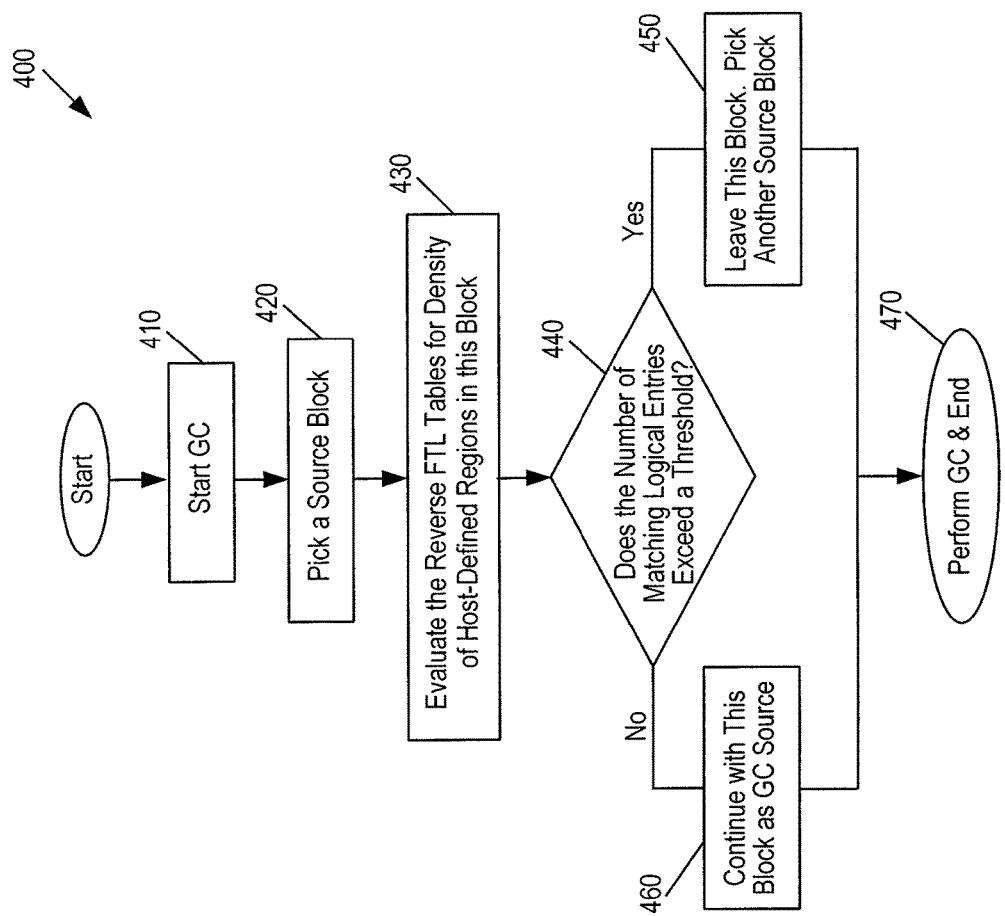
FIG. 4 is a flow chart of a method for modifying a garbage collection policy of a storage system of an embodiment.

Turning again to the drawings, FIG. 4 is a flow chart 400 of a method of an embodiment for modifying a garbage collection policy. As shown in FIG. 4, after the storage system 100 starts garbage collection (act 410), it picks a source block (act 420). The storage system 100 then evaluates the reverse FTL tables for density of the host-defined regions in this block (act 430). Next, the storage system 100 determines if the number of logical entries matching the host-defined region exceeds a threshold (act 440). If it does, the storage system 100 leaves this block, picks another source block, and performs garbage collection (acts 450 and 470). On the other hand, if the number of logical entries matching the host-defined region does not exceed the threshold, the storage system 100 continues with this block as the garbage collection source and performs garbage collection (acts 460 and 470).

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/or over a substrate may be arranged in two or three dimensions, such as a two dimensional memory structure or a three dimensional memory structure.

In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three dimensional structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the embodiments described herein can be used alone or in combination with one another.

What is claimed is:

1. A method for enabling host-driven regional performance in memory, the method comprising:
   performing the following in a storage system comprising a non-volatile memory and a volatile memory:
      receiving a directive from a host device as to a preferred logical region of the non-volatile memory;
      based on the directive, modifying a caching policy specifying which pages of a logical-to-physical address map stored in the non-volatile memory are to be cached in the volatile memory, wherein priority is given to pages of the logical-to-physical address map that cover the preferred logical region over other pages of the logical-to-physical address map;
      caching, in the volatile memory, the pages of the logical-to-physical address map that cover the preferred logical region; and
      preventing the pages of the logical-to-physical address map that cover the preferred logical region from being removed from the volatile memory until a different directive from the host device is received to set a new preferred logical region.

2. The method of claim 1, wherein priority is given by caching only those pages of the logical-to-physical address map that cover the preferred logical region.

3. The method of claim 1, wherein priority is given by caching more pages of the logical-to-physical address map that cover the preferred logical region than pages of the logical-to-physical address map that cover other logical regions.

4. The method of claim 1, wherein the pages of the logical-to-physical address map that cover the preferred logical region are prevented from being removed from the volatile memory by avoiding, during a swap in/out process, evicting pages of the logical-to-physical address map that cover the preferred logical region.

5. The method of claim 1, further comprising mapping the preferred logical region to one or more single level cell (SLC) blocks in the non-volatile memory.

6. The method of claim 1, wherein the non-volatile memory comprises a three-dimensional memory.

7. A storage system comprising:
a non-volatile memory;
a volatile memory; and
a controller configured to:
  receive an indication from a host as to a preferred logical region of the non-volatile memory;
  based on the indication, change a caching policy specifying which pages of a logical-to-physical address map stored in the non-volatile memory are to be cached in the volatile memory, wherein priority is given to pages of the logical-to-physical address map that cover the preferred logical region over other pages of the logical-to-physical address map;
  cache, in the volatile memory, the pages of the logical-to-physical address map that cover the preferred logical region; and
  prevent the pages of the logical-to-physical address map that cover the preferred logical region from being removed from the volatile memory until a different indication is received from the host to set a new preferred logical region.

8. The storage system of claim 7, wherein priority is given by caching only those pages of the logical-to-physical address map that cover the preferred logical region.

9. The storage system of claim 7, wherein priority is given by caching more pages of the logical-to-physical address map that cover the preferred logical region than pages of the logical-to-physical address map that cover other logical regions.

10. The storage system of claim 7, wherein the pages of the logical-to-physical address map that cover the preferred logical region are prevented from being removed from the volatile memory by avoiding, during a swap in/out process, evicting pages of the logical-to-physical address map that cover the preferred logical region.

11. The storage system of claim 7, wherein the controller is further configured to map the preferred logical region to one or more single level cell (SLC) blocks in the non-volatile memory.

12. The storage system of claim 7, wherein the non-volatile memory comprises a three-dimensional memory.

13. A storage system comprising:
a non-volatile memory;
a volatile memory;
means for receiving an instruction from a host device as to a preferred logical area of the non-volatile memory;
means for modifying, based on the instruction, a caching policy specifying which pages of a logical-to-physical address map stored in the non-volatile memory are to be cached in the volatile memory, wherein priority is given to pages of the logical-to-physical address map that cover the preferred logical area over other pages of the logical-to-physical address map;
means for caching, in the volatile memory, the pages of the logical-to-physical address map that cover the preferred logical area; and
means for preventing the pages of the logical-to-physical address map that cover the preferred logical area from being removed from the volatile memory until a different instruction is received from the host device to set a new preferred logical area.

14. The storage system of claim 13, wherein priority is given by caching only those pages of the logical-to-physical address map that cover the preferred logical area.

15. The storage system of claim 13, wherein priority is given by caching more pages of the logical-to-physical address map that cover the preferred logical area than pages of the logical-to-physical address map that cover other logical areas.

16. The storage system of claim 13, wherein the pages of the logical-to-physical address map that cover the preferred logical area are prevented from being removed from the volatile memory by avoiding, during a swap in/out process, evicting pages of the logical-to-physical address map that cover the preferred logical area.

17. The storage system of claim 13, further comprising means for mapping the preferred logical area to one or more single level cell (SLC) blocks in the non-volatile memory.

18. The storage system of claim 13, wherein the non-volatile memory comprises a three-dimensional memory.

19. The storage system of claim 13, wherein the means for receiving and the means for modifying comprise a controller.

20. The storage system of claim 13, wherein the storage system is integrated in the host device.

* * * * *